US006458226B1

(12) United States Patent
Bilgen et al.

(10) Patent No.: US 6,458,226 B1
(45) Date of Patent: Oct. 1, 2002

(54) PROCESS FOR THE THERMOMECHANICAL TREATMENT OF STEEL

(75) Inventors: Christian Bilgen, Siegen; Eberthard Kast, Erkrath; Andreas Kleemann, Weissensee; Hans-Günther Krull, Duisburg; Thomas Muhr, Attendorn; Horst Weiss, Netphen, all of (DE)

(73) Assignee: Muhr und Bender, Attendorn (DE)

( * ) Notice: Subject to any disclaimer, the term of this patent is extended or adjusted under 35 U.S.C. 154(b) by 0 days.

(21) Appl. No.: 09/357,568

(22) Filed: Jul. 20, 1999

(30) Foreign Application Priority Data

| Jul. 20, 1998 | (DE) | ................................. | 198 32 526 |
| Aug. 31, 1998 | (DE) | ................................. | 198 39 383 |

(51) Int. Cl.[7] ................................. C21D 9/02
(52) U.S. Cl. ................ 148/567; 148/580; 148/575
(58) Field of Search ................ 148/580, 567, 148/575

(56) References Cited

U.S. PATENT DOCUMENTS

| 2,527,521 | A | * | 10/1950 | Bloom ................ 148/12.4 |
| 2,542,940 | A | * | 2/1951 | Pioch et al. ................ 266/4 |
| 3,345,727 | A | * | 10/1967 | Komarnitsky ................ 29/173 |
| 4,711,675 | A | * | 12/1987 | Yamamoto et al. ........ 148/144 |
| 5,368,656 | A | * | 11/1994 | Heimann et al. ........... 148/333 |

FOREIGN PATENT DOCUMENTS

| DE | 4340568 | * | 6/1995 |
| DE | 19546204 | * | 3/1997 |
| EP | 0431224 | * | 6/1991 |
| JP | 59-096246 | * | 6/1984 |
| JP | 60-009827 | * | 1/1985 |
| JP | 05-059431 | * | 3/1993 |

OTHER PUBLICATIONS

ASM Handbook, vol. 4 Heat Treating, p185, 1991.*

* cited by examiner

Primary Examiner—Roy King
Assistant Examiner—Janelle Combs Morillo
(74) Attorney, Agent, or Firm—Nixon Peabody LLP; David S. Safran

(57) ABSTRACT

A process for thermomechanical treatment of steel for torsionally-strained spring elements, the initial material being heated with a heating rate of at least 50 K/s and austenitized, and then, being formed in at least one forming step with the formed product being quenched to below the martensite temperature to martensite and then tempered. To improve the strength or toughness properties of the spring steel in the strain direction of the torsionally strained spring elements so that the increase of vibration strength is considerable, the initial material is heated to a temperature above the recrystallization temperature and then formed at such a temperature, that dynamic and/or static recrystallization of the austenite occurs, and that the recrystallized austenite of the formed product is quenched.

2 Claims, 1 Drawing Sheet

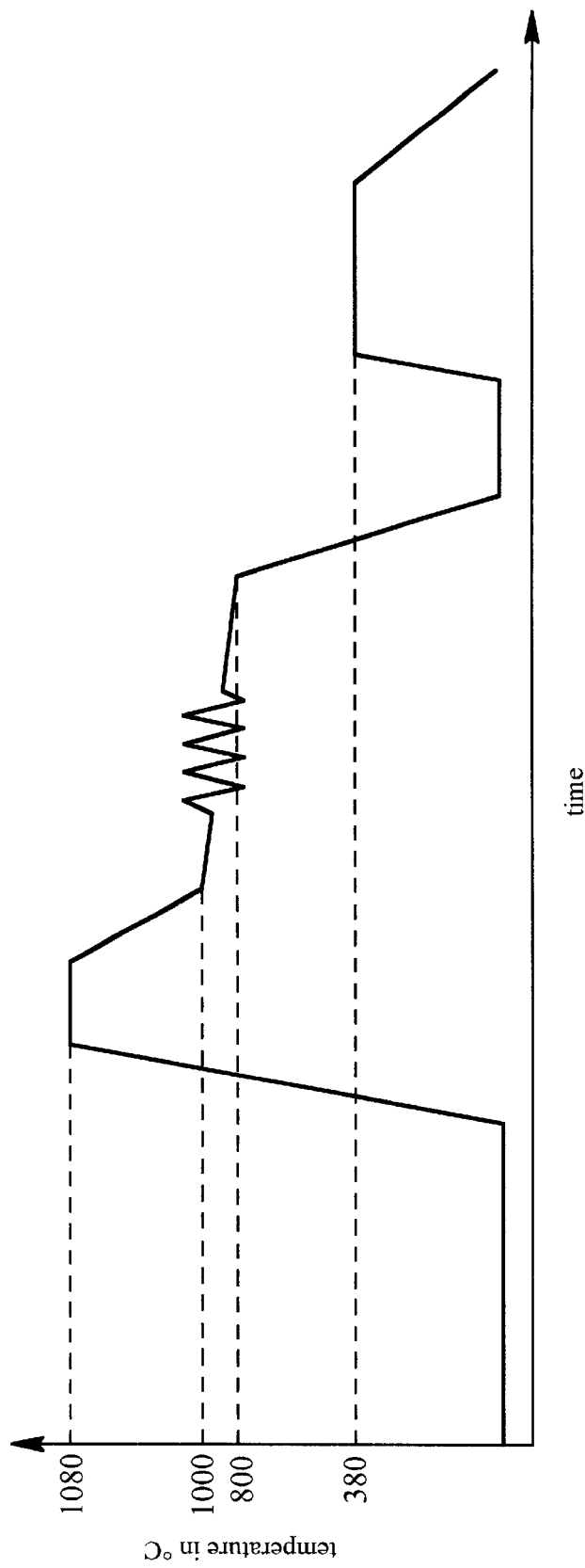

PROCESS FOR THE THERMOMECHANICAL TREATMENT OF STEEL

BACKGROUND OF THE INVENTION

1. Field of the Invention

The invention relates to a process for the thermomechanical treatment of steel for torsionally-strained spring elements, the initial material being heated with a heating rate of at least 50 K/s and austenitized, and the product then being formed in at least one forming step with the formed product being quenched to below the martensite temperature to martensite and then tempered.

2. Description of Related Art

A process of the initially mentioned type is already known from German Patent No. DE 43 40 568 C2. In this known process, wire, as the initial material, is heated at a rate between 85 K/s and 100 K/s to a temperature above $A_{c3}$, specifically to a temperature of 860° C. and then held for 10 to 30 seconds, in order, on the one hand, to achieve complete conversion of the ferrite structure into austenite, and on the other hand, to produce a uniform distribution of the carbon in the austenite. To achieve a higher level of fine graininess, then, forming takes place at 860° C., the wire being ovalized in a first pass, rolled round in a second pass and then driven through a calibration nozzle. Afterwards, the wire is quenched and tempered again. The austenite is quenched to martensite in this known process with a microstructure which is not recrystallized. The strength or toughness properties of the wire produced using this known process can be improved with respect to increased vibration strength which is necessary for torsionally-strained spring elements.

German Patent No. DE 195 46 204 C1 discloses a process for producing spring elements from a heat treated steel in which thermomechanical treatment of the initial material is performed with the following steps:
a) The initial material of the steel is solutionized in the austenite range at temperatures from 1050 to 1200° C.,
b) directly thereafter the first forming is performed above the recrystallization temperature,
c) directly thereafter a second forming is performed below the recrystallization temperature, but above $A_{r3}$.
d) further forming and working processes are carried out below the recrystallization temperature, but above the $A_{r3}$ temperature, the holding time lasting one minute,
e) then, the rolled product is quenched to below the martensite temperature and finally tempered.

The austenite is quenched in this known process to martensite, likewise, with a microstructure which is not recrystallized by the forming according to the aforementioned steps c) and d). Since, in this known process, forming is performed not only below the recrystallization temperature, but holding times are even longer before quenching at high temperatures, there is otherwise considerable grain growth.

According to research by the applicant, the use of the known process leads to fine acicular, but highly textured martensite microstructures with strength and toughness properties which are good in the rolling direction. The known process is therefore suited for spring elements which are exposed to tensile/compressive loading in the rolling direction, as is especially the case in leaf springs.

In torsion-strained spring elements, such as helical springs and stabilizers, the direction of maximum loading does not correspond to the preferred direction of maximum strength which is produced by the aforementioned process. Rather, thermomechanical treatment which leads to an unrecrystallized, less recovered austenite grain is not suited for steels for torsionally loaded spring elements, and it does not lead to an improvement of vibration strength.

SUMMARY OF THE INVENTION

The primary object of this invention is, therefore, to provide a process for thermomechanical treatment of steel in torsionally strained spring elements which leads to improvement of the strength or toughness properties of the spring steel in the direction of strain of the torsionally strained spring elements so that considerable recovery of vibration strength occurs.

This object is achieved in accordance with the present invention in a process for thermomechanical treatment of steel in torsionally strained spring elements essentially by the fact that the initial material is heated to a temperature above the recrystallization temperature and then is formed at such a temperature, that dynamic and/or static recrystallization of the austenite occurs, and that the austenite of the forming product recrystallized in this way is quenched.

In the process according to the invention, heating proceeds into the austenite range to above the recrystallization temperature in a very short time; this does not allow the austenite grains time to grow into coarser grains. Subsequent forming in the corresponding temperature range yields dynamic recrystallization (during forming) and/or static recrystallization (after forming); this is also called crystalline modification, and as a result, leads to extremely fine-grained austenite crystals. These ultrafine recrystallized crystallites are then converted, during subsequent quenching, into an extremely fine-acicular martensitic microstructure. After quenching treatment, finally, tempering to the desired strength-toughness combination takes place.

A key difference between the invention and the prior art lies in allowing the austenite to recrystallize, subjecting it to forming treatment in the recrystallized state, then allowing static and/or dynamic recrystallization to proceed, and finally quenching the recrystallized austenite to martensite.

The martensite formed by the process of the present invention, as compared to the microstructures which have been produced using the known processes, has highly improved strength and toughness properties in the strain direction of the torsionally strained spring elements so that the increase of strength is considerable.

Preferably, the initial material is heated with a heating rate between 80 and 150 K/s to a temperature of at least 900° C., preferably a temperature between 900° C. and 1200° C. This heating takes place preferably inductively.

One especially good result is achieved when forming takes place in at least two forming steps above the recrystallization temperature. Also, several forming steps can be carried out above the recrystallization temperature, preferably four forming steps. Otherwise, it is recommended that forming be carried out with a total logarithmic degree of forming of at least 0.1.

The initially fine austenite crystallites are made even finer by the above described repeated static and dynamic recrystallization during or after forming.

To give no time for the austenite crystallites to grow between the individual forming steps, it is furthermore provided that the holding time between the forming steps be very short, in any case less than one minute. Preferably, only a few seconds of holding time are provided between the forming steps. Forming itself proceeds, in one preferred embodiment, in the temperature range between roughly 1000° C. and 800° C., and the material should be reheated between successive forming steps to enable recrystallization.

To even further refine the martensite microstructure which has formed after quenching, it is, moreover, provided that the material be re-austenitized quickly and the resulting austenite in turn requenched after further forming, or even without forming. Cold working before or after tempering is easily possible.

In the process in accordance with the invention, as the initial material, especially a silicon-chromium steel with a carbon content of 0.35% to 0.75% is used which is microalloyed with vanadium or another alloying element.

These and further objects, features and advantages of the present invention will become apparent from the following description when taken in connection with the accompanying drawings which, for purposes of illustration only, show only a single embodiment in accordance with the present invention.

BRIEF DESCRIPTION OF THE DRAWINGS

The sole figure shows a temperature-time diagram of one embodiment of the process according to the invention, the divisions of the temperature axis not being to scale.

DETAILED DESCRIPTION OF THE INVENTION

The initial material is inductively heated from the initial temperature to 1080° C. at a rate between 80 and 150 K/s within a few seconds at the beginning of the process. Then, a temperature of 1080° C. is held for a short time; it then drops to roughly 1000° C. Then, four forming steps follow, each in the form of passes, in the temperature range between 1000° C. and 800° C., the holding times between the passes being only very short in order not to give the austenite crystallites time to grow.

After each pass, heating is briefly repeated to achieve a temperature of roughly 1000° C. In this embodiment, during forming, a total logarithmic amount of deformation of at least 0.1 is reached. After the last pass, the temperature is again briefly raised to the range above 800° C. and is held briefly with a small temperature drop. Then, fast quenching to room temperature with a quenching rate greater than 50 K/s and subsequent tempering to a temperature of roughly 380° C. take place.

In the above described embodiment, the initial material is a silicon-chromium steel which is microalloyed with vanadium and which has a carbon content from 0.45% to 0.65% (58SiCrV6). Austenitization and recrystallization at 1080° C. and crystalline modification during the four passes between 1000° C. and 800° C. yielded a former austenite grain diameter of 3.6 microns. For this material, at tensile strengths of 2400 MPa, reductions of area after fracture of greater than 40% were measured. For a tensile strength of 2280 MPA, the torsion fatigue strength without shot peening was increased to 700±345 MPa.

The attainable austenite grain size can be easily influenced in the process in accordance with the invention. The important parameters are:

the alloy composition, especially the addition of vanadium or addition of another microalloying element, austenitization temperature, heat-up time and holding time, the forming temperature range and holding time between the forming steps, the number of forming steps, total logarithmic degree of forming and distribution of the total degree of forming among the individual forming steps.

In a comparison test carried out using the same spring steel (58SiCrV6), tensile strengths of only 2150 MPa with sufficient toughness (reductions in area after fracture of >40%) can be achieved by inductive hardening. Here, austenitization occurred at 1000° C. and tempering at 480° C. For this material, a torsion fatigue strength of 700±320 MPa was ascertained. The former austenite grain structure as a measure to describe the fineness of the microstructure for the version studied was 8.8 microns.

By choosing a lower tempering temperature to adjust even higher material strengths, the deformation strength of the material would be reduced to below the required minimum boundary and the material would thus be useless for producing load-bearing springs.

As a result, compared to inductive hardening, the invention yields growth of the stress amplitude of 8% which was permanently supported. For higher material strengths, accordingly, there were still better fatigue strengths.

Finally, it should be pointed out that, for the process in accordance with the invention, the choice of the initial material is important. One especially suitable initial material is steel microalloyed with vanadium and/or another alloying element. Otherwise, the initial material should be one which has only few inclusions and/or only inclusions with a minimum size.

It is to be understood that the invention is not limited to the above described embodiment, and is susceptible to numerous changes and modifications as known to those skilled in the art. Therefore, this invention is not limited to the details shown and described herein, and includes all such changes and modifications as are encompassed by the scope of the appended claims.

We claim:

1. Process for thermomechanical treatment of steel for torsionally-strained spring elements, comprising the steps of:

heating an initial material with a heating rate of at least 50 K/s to a temperature above the recrystallization temperature of the initial material;

austenitizing the initial material and forming the heated initial material into a formed product in a manner and at a temperature producing recrystallization of the austenite, said forming being performed in at least two forming passes, each of which is performed at a temperature above the recrystallization temperature so as to increase strength and toughness properties in a strain direction of torsionally-strained spring elements produced with the formed product; and quenching the recrystallized austenite of the formed product to below the martensite temperature to martensite and then performing tempering;

wherein the formed product is austenitized at least once more after said quenching, and then, quenching performed again.

2. Process as claimed in claim 1, wherein, in at least one forming step, forming is performed in the austenitized state.

* * * * *